United States Patent
Gunyuzlu et al.

(10) Patent No.: US 11,948,008 B2
(45) Date of Patent: Apr. 2, 2024

(54) SYSTEM MANAGEMENT MEMORY COHERENCY DETECTION

(71) Applicant: Hewlett-Packard Development Company, L.P., Spring, TX (US)

(72) Inventors: Mason Gunyuzlu, Spring, TX (US); Valiuddin Ali, Spring, TX (US); Robert Craig, Spring, TX (US); Tevin Richards, Spring, TX (US); Richard Bramley, Mansfield, MA (US); Endrigo Nadin Pinheiro, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 283 days.

(21) Appl. No.: 17/293,015

(22) PCT Filed: Apr. 30, 2019

(86) PCT No.: PCT/US2019/029928
§ 371 (c)(1),
(2) Date: May 11, 2021

(87) PCT Pub. No.: WO2020/222804
PCT Pub. Date: Nov. 5, 2020

(65) Prior Publication Data
US 2022/0043683 A1 Feb. 10, 2022

(51) Int. Cl.
*G06F 9/50* (2006.01)

(52) U.S. Cl.
CPC ................. *G06F 9/5016* (2013.01)

(58) Field of Classification Search
CPC ...... G06F 21/55; G06F 21/572; G06F 21/602; G06F 9/5016; G06F 21/566; G06F 21/64; G06F 21/79; H04L 9/0822
See application file for complete search history.

(56) References Cited

U.S. PATENT DOCUMENTS

| | | |
|---|---|---|
| 6,453,278 B1 | 9/2002 | Favor et al. |
| 6,848,046 B2 | 1/2005 | Zimmer |
| 7,219,241 B2 | 5/2007 | Cooper et al. |
| 9,047,263 B2 | 6/2015 | Wynn |
| 2001/0008015 A1* | 7/2001 | Vu .......................... G06F 21/34 713/185 |

(Continued)

OTHER PUBLICATIONS

Keong T. C., "Win2K Kernel Hidden Process/Module Checker 0.1 (Proof-of-Concept)", Internet Citation, 2005, XP002421381, retrieved from : http://www.security.org.sg/code/kproccheck.html, 4 pages.

(Continued)

*Primary Examiner* — Kenneth Tang
(74) *Attorney, Agent, or Firm* — Knobbe, Martens, Olson & Bear, LLP

(57) ABSTRACT

In an example, a system includes a firmware controller to initiate a SM execution mode of the system. The firmware controller scans memory for a process pool tag. The firmware controller compares the process pool tag to a set of operating system process pool tags and detects a coherency discrepancy between the process pool tag and the set of operating system process pool tags. The firmware controller exits the SM execution mode of the system.

15 Claims, 4 Drawing Sheets

(56) References Cited

U.S. PATENT DOCUMENTS

| | | | |
|---|---|---|---|
| 2003/0172265 A1* | 9/2003 | Vu | H04L 9/3234 |
| | | | 726/9 |
| 2006/0294355 A1* | 12/2006 | Zimmer | G06F 21/572 |
| | | | 713/2 |
| 2010/0161909 A1* | 6/2010 | Nation | G06F 9/5016 |
| | | | 711/147 |
| 2010/0161929 A1* | 6/2010 | Nation | G06F 12/0284 |
| | | | 711/170 |
| 2011/0246817 A1 | 10/2011 | Orsini et al. | |
| 2013/0340081 A1 | 12/2013 | Sakthikumar et al. | |
| 2014/0108726 A1 | 4/2014 | Laurich et al. | |
| 2015/0033340 A1 | 1/2015 | Giokas | |
| 2015/0121087 A1 | 4/2015 | Mittal | |
| 2015/0281237 A1* | 10/2015 | Swanson | H04L 63/10 |
| | | | 726/3 |
| 2017/0262352 A1 | 9/2017 | Jeansonne et al. | |
| 2019/0377694 A1* | 12/2019 | Muthukrishnan | G06F 12/1458 |
| 2020/0201998 A1* | 6/2020 | Jung | G06F 11/3037 |
| 2021/0406378 A1* | 12/2021 | Jeansonne | G06F 21/602 |
| 2023/0185732 A1* | 6/2023 | Li | G06F 21/602 |
| | | | 713/193 |

OTHER PUBLICATIONS

Zhang et al., "Spectre: A dependable introspection framework via System Management Mode", 2013 43rd Annual IEEE/IFIP International Conference on Dependable Systems and Networks (DSN), IEEE, 2013, pp. 1-12.

* cited by examiner

SYSTEM MANAGEMENT MEMORY COHERENCY DETECTION

BACKGROUND

Firmware controllers provide support for bootstrapping an operating system. Firmware controllers provide hardware and low-level driver initialization prior to handing system control to the operating system.

DETAILED DESCRIPTION

In a computer system, malware injection techniques have been developed to mimic or mask resources within the operating system to avoid detection. Malware may take the form of non-malicious applications as well as hiding resources from the operating system. Malware applications may obscure their corresponding process pool information from the operating system, thereby hiding themselves from the host operating system as well as anti-viral applications that rely on the operating system. Herein is disclosed is a system for system management memory coherency detection.

Examples described herein provide an approach to detect system management memory coherency. In one example, the system may include a SM memory segment, an operating system memory segment, and a firmware controller. The firmware controller may be configured to enter a SM execution mode. During SM execution mode, the firmware controller may retrieve a set of process pool tags from the operating system memory segment. The firmware controller may compare the set of process pool tags to a second set of process pool tags stored in the SM memory segment. The firmware controller may detect a coherency discrepancy based on the comparison and generate a system interrupt. The firmware controller then exits the SM execution mode.

Figure 1:
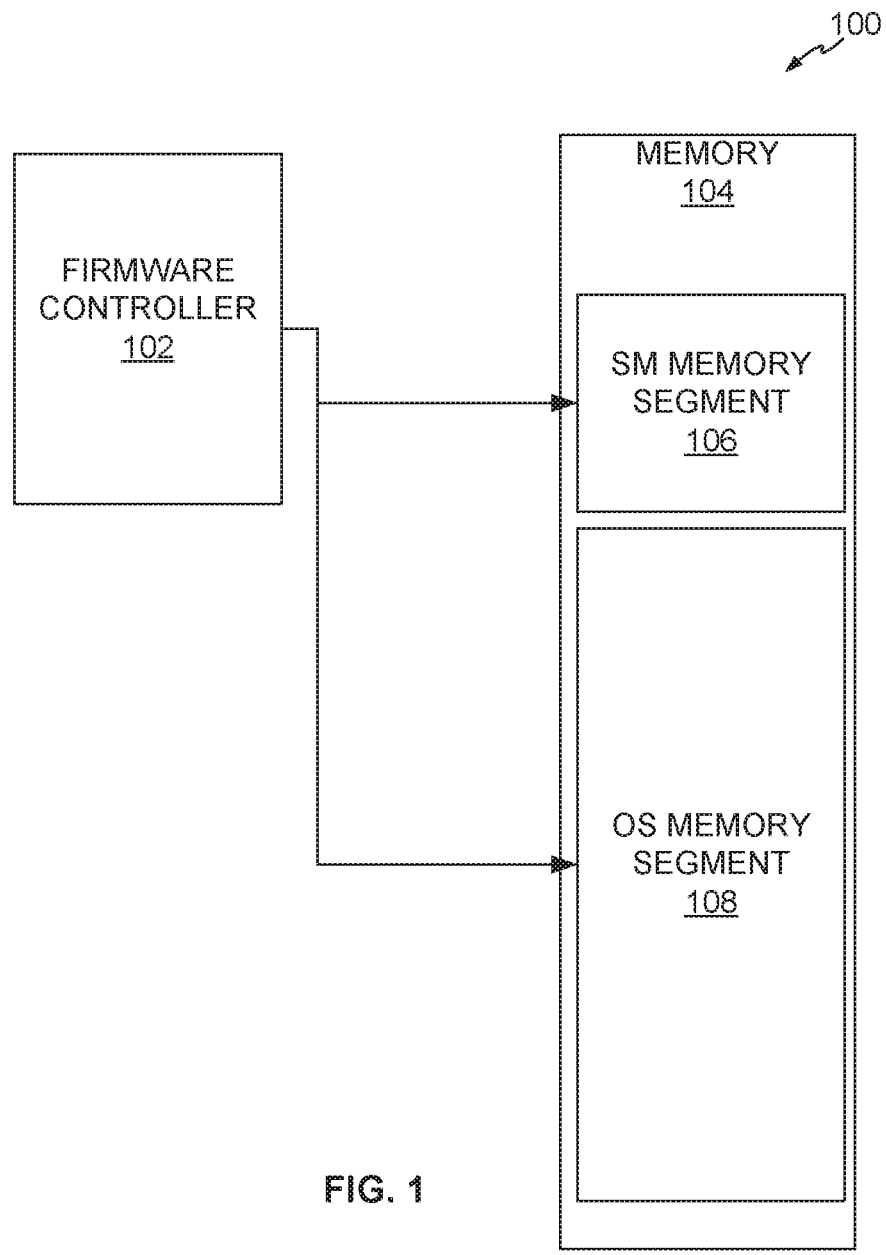
FIG. 1 illustrates a system utilizing system management memory coherency detection, according to an example.

FIG. 1 illustrates a system 100 utilizing system management memory coherency detection, according to an example. The system 100 may include a firmware controller 102, a memory 104, a SM memory segment 106, and an operation system (OS) memory segment 108. The system 100 may be implemented internal to a computing device included but not limited to a laptop personal computer, desktop personal computer, server, or mobile handheld device. The firmware controller 102 may include a UEFI implementation for the setup and configuration of system 100 hardware. The firmware controller 102 may be communicatively coupled to a communication channel (not shown) to interface the memory 104. Additionally, the firmware controller 102 may be communicatively coupled to CPU. The firmware controller 102 may include the logic to execute programmed instructions to support comparator operators as well as memory access reads and writes. The firmware controller 102 may include a system management interrupt (SMI) handler. The SMI handler is a routine executed when the operating system instantiates an SMI. The SMI handler may include logic to scan the OS memory segment 108 and locate process pool tags. Process pool tags may vary across operating systems, however, the information in the tag allow an interpretation of the location and type of the process to which it corresponds. The process pool tag may allow for the interpretation of a data structure in memory corresponding to a process. The process pool tag may be mapped to specific driver files within the operating system to identify memory activity for that driver (e.g. allocations, frees, etc.). The operating system may provide a mapping for the specific process pool tag to the respective driver file. Process pool tags may correspond to but not limited to operating system constructs including processes, threads, mutexes, driver objects, and kernel modules.

The memory 104 supports both the firmware controller 102 and the CPU (not shown). The memory 104 provides random access to storage for firmware controller 102 as well as a CPU when an operating system is executing. The memory 104 may include but is not limited any form of dynamic random access memory (RAM) including synchronous dynamic random access memory (SDRAM) memory and high bandwidth memory (HBM). In a personal computer implementation, the memory 104 may be a dual inline memory module (DIMM). The memory 104 may support read and write access for the firmware controller 102.

The SM memory segment 106 may be a reserved memory segment in memory 104. During system 100 boot, the firmware controller 102 may allocate a segment of memory for SM execution mode. The SM memory segment 106 may include one or more reserved addressable memory to support context switching by the CPU. Additionally, the firmware controller 102 may reserve a portion of the SM memory segment 106 for detecting operating system memory coherency.

The operating system (OS) memory segment 108 may include a portion of non-reserved memory 104. The OS memory segment 108 may include logical data structures for the operation and securing of the operating system. The OS memory segment 108 may have elevated privilege requirements for security.

The firmware controller 102 in the computer system initializes hardware and loads device drivers. Upon completion of hardware "bootstrapping", the firmware controller hands control over to the operating system.

During the boot process, the firmware controller allocates system management random access memory (SMRAM) as a part of the SM memory segment 106. The SMRAM has a base address corresponding to the allocated area, as well as offsets based on available central processing unit (CPU) processing cores. In a typical operation, the SMRAM may be utilized for storing CPU registers or CPU context during system management mode (SMM) operations. Offsets plus the base address may be used to define areas of SMRAM for CPU contexts in multi CPU-core systems. SMRAM may be reserved for SMM operations and may be inaccessible by the host operating system. SMM operations may be invoked during operating system execution, to provide low level device management such as managing thermal performance.

As SMRAM is inaccessible for by the operating system, and subsequent user applications, the firmware controller 102 may utilize the SMRAM for security. In one implementation, the firmware controller 102 may generate a series of cryptographic keys for authentication purposes. The cryptographic keys may be stored in SMRAM and utilized during SMI events, and thereby may be inaccessible by the operating system.

Figure 2:
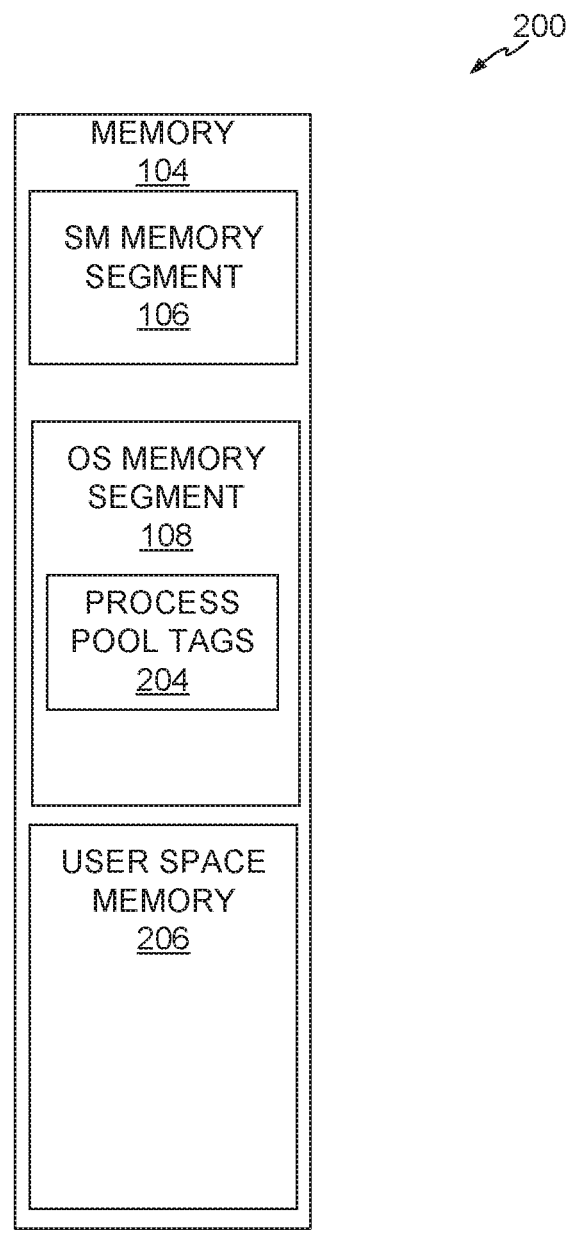
FIG. 2 is a block diagram of a memory allocation for system management memory coherency detection, according to an example.

FIG. 2 is a block diagram 200 of a memory allocation for system management memory coherency detection, according to an example. The memory 104 may include a SM memory segment 106, and an OS memory segment 108 as described previously. The OS memory segment 108 may include a set of process pool tags 204 for currently executing processes. The process pool tags 204 may be included in memory management data structures utilized by the operating system to track memory allocated and freed by a process running under operating system control. The process pool tags 204 may exist in the OS memory segment 108 and may be identifiable by descriptors written in memory to identify memory pool tables.

User space memory 206 may provide read and write support for the execution of user applications, separate from the OS memory segment 108. User space memory 206 may be used for common user applications such as web browsers and word processors. Access privileges for user space memory 206 are less restrictive than the OS memory segment 108. The SM memory segment 106 may include access privileges higher than the OS memory segment 108. In some implementations, the operating system may be unaware of the allocation of the SM memory segment 106. A SMI handler may be able to access the entirety of the memory 104 in SM mode.

In some implementations, the operating system may allocate a portion of the OS memory segment 108 for use during operations after an SMI event. Additionally, the operating system may allocate a portion of the user space memory 206 for use during operations after an SMI event. In another implementation, a user space application may allocate a portion of user space memory 206 for which that application has privileges for access. The allocated memory, either in the OS memory segment 108 or in the user space memory 206 may be utilized as a high-speed communication channel for the operating system or an application to communicate with the firmware controller prior to the SMI event. In one implementation, the allocated memory space may be at an address known prior by the firmware controller 102. In an implementation, the allocated memory, either in the OS memory segment 108 or in the user space memory 206 may be utilized to securely communicate any data between the firmware controller 102 and an SMI initiating process.

Figure 3:
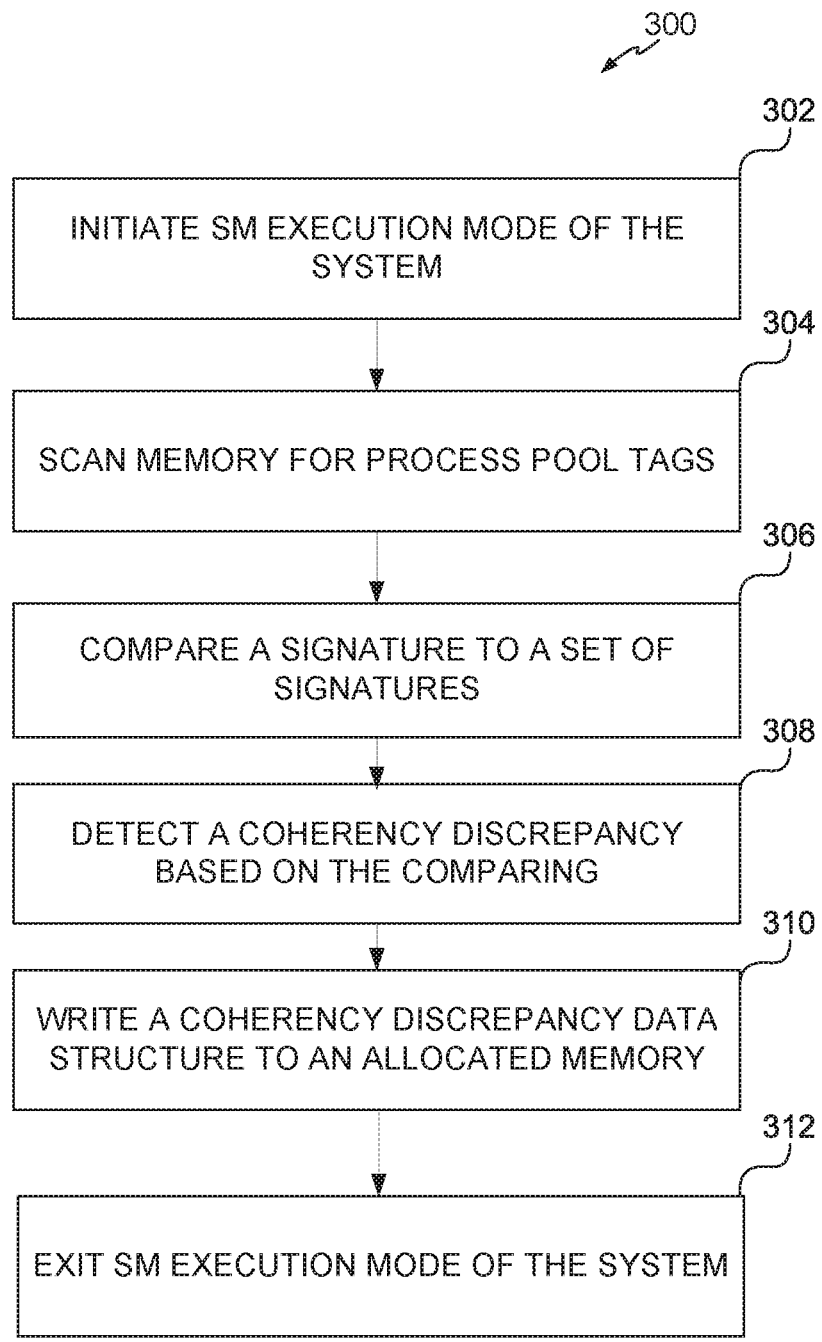
FIG. 3 is a flow diagram illustrating a method utilizing system management memory coherency detection, in accordance with an example of the present disclosure.

FIG. 3 is a flow diagram 302 illustrating a method utilizing system management memory coherency detection, in accordance with an example of the present disclosure. For purposes of explanation, references to components in FIG. 1 and FIG. 2 may be utilized in describing the executing of the method.

At 302, the firmware controller 102 initiates SM execution mode. The firmware controller 102 receives a special instruction which invokes a SMI and changes the operating context of the system to system management execution mode. The current context of the CPU may be written to SMRAM in the SM memory segment 106 to preserve the operational state of the computer system for return to normal execution. Upon changing context to SM execution mode, the firmware controller 102 executes a SMI handler. The SMI handler may be written as a piece of logic encoded into the firmware controller itself. In some implementations, the SMI handler may be programmable code into a non-volatile memory. In a secure communication implementation, the process that instantiates the SMI event, may copy a cryptographic key to an allocated OS memory segment 108 or user space memory 206 known to the firmware controller 102. Upon entering the SM execution mode, the firmware controller 102 may authenticate the cryptographic key copied to the allocated OS memory segment 108 or user space memory 206 known by the firmware controller 102. The firmware controller 102 may compare the cryptographic key to the generated cryptographic keys stored in SMRAM to authenticate the process that generated the SMI event. The firmware controller 102, after validating the cryptographic key, may validate that a set of process pool tags as reported by the operating system are present. The firmware controller 102 may additionally validate any data within the process pool tag structure to verify that the SMI invoking process has not been process hollowed. The operating system process pool tags may be generated by an application programming interface call to the OS, and subsequently stored in the allocated OS memory segment 108 or user space memory 206 known to the firmware controller 102. In another embodiment, the operating system process pool tags may include a predefined list of known non-malicious processes. In another implementation, the operating system process pool tags may be detected by the firmware controller 104 scanning the memory 104 during the SM execution mode of the system. In another example, during the SMI execution mode, the firmware controller 102 may securely directly inject a cryptographic key into the SMI initiating process's memory space. The cryptographic key may be utilized for the SMI initiating process to utilized to authenticate itself with the firmware controller 102.

At 304, the firmware controller 102 scans memory 104 for process pool tags. The firmware controller 102 may execute the SMI handler to search for process pool tags. Searching may include algorithms to look for certain patterns indicating memory pool allocation in memory 104. Upon the discovery of a memory pool allocation, the firmware controller 102 may further scan the memory pool allocation for process pool tags corresponding to processes executing prior to the context switch. The firmware controller may store any discovered process pool tags in an allocated section of the SM memory segment 106 for processing. In another embodiment, the firmware controller 102 may store any discovered process pool tag in the allocated OS memory segment 108 or user space memory 206 known to the firmware controller 102.

At 306, the firmware controller 102 compares a signature of the process pool tag to a set of signatures of the known operating system process pool tags. The firmware controller 102 may generate a signature for the discovered process pool tag based on the type, size and location of the discovered process pool tag to validate that the discovered process pool tag is known by the operating system. Utilizing a signature may enable the firmware controller 102 to more efficiently compare process pool tags. The firmware controller 102 may compare the discovered process pool tag(s) to a set of known process pool tags provided by the operating system prior to the SMI. The operating system may be instructed through an application programming interface to output all of the process pool information for which it is aware. In one example, the outputting may include writing the process pool information to the allocated OS memory segment 108 or user space memory 206 for which the firmware controller 102 is aware and has access. The firmware controller 102 directly compares the discovered process pool tag to that which was written to user space memory 206. As the firmware controller 102 may have access to all memory 104, it may be possible for the operating system to provide its record of the known process pool tags directly in the OS memory segment 108. In an implementation in which the firmware controller 102 does not detect a mismatch the firmware controller 102 may securely provide cryptographic keys with mitigated risk of intercept by malicious processes.

At 308, the firmware controller 102 detects a coherency discrepancy based on the comparing. In the event that the discovered process pool tag does not exist in the known process pool tag lists, a coherency discrepancy may be detected. In another example, there may be a mismatch between the detected process pool tag and the known process pool tag list. A mismatch may include the process pool tag existing in the known process pool tag list, however, a parameter relating to the detected process pool tag is not consistent, possibly indicating a manipulation of the process pool tag. A coherency discrepancy may be evidence of malware execution wherein the malware alters the operating system memory to disguise itself. In some malware infections, a malware may alter its corresponding process pool tag within the operating system so that it may still execute but would be invisible to software utilizing the operating system application programming interfaces (APIs) to capture executing processes.

At 310, the firmware controller 102 writes a coherency discrepancy data structure to an allocated memory. The coherency discrepancy data structure may be one that indicates the discrepancy (e.g. process pool tags not reported by an application). Additionally, the coherency discrepancy data structure may also include cryptographic keys utilized by the firmware controller 102 to update the SMI event initiating process. In one implementation, a data structure including information relevant to the coherency discrepancy may be stored in a prior allocated OS memory segment 108 or user space memory 206. In some implementations, the firmware controller 102 may rotate cryptographic keys to the process that initiated the SMI event. The firmware controller 102 may include a new cryptographic key to the process with the data structure written to the prior allocated OS memory segment 108 or user space memory 206. This approach has the advantage of providing the process that initiated the SMI event with a cryptographic key with minimal chance of interception as the SMI event is uninterruptable, and execution returns to the initiating process.

At 312, the firmware controller 102 exits SM execution mode. The firmware controller 102 may execute a resume command for the compatible platform architecture. In the event that the firmware controller 102 stored a data structure including information relevant to the coherency discrepancy in a prior allocated OS memory segment 108 or user space memory 206, the coherency discrepancy information may be extracted by the SMI initiating processes during normal execution. The firmware controller 102 may copy CPU context information from SMRAM back into the appropriate CPU registers to resume execution. Utilizing this approach, the SMI event may be uninterruptable, and the invoking application receives the data in the prior allocated OS memory segment 108 or user space memory 206 without the possibility of malware interception. The data provided from the SM execution mode to a process outside of SM execution mode allows the operating system or another application, such as an antivirus, to take action. Likewise, if a new cryptographic key was provided by the firmware controller 102, the SMI event initiating process may extract it then.

Figure 4:
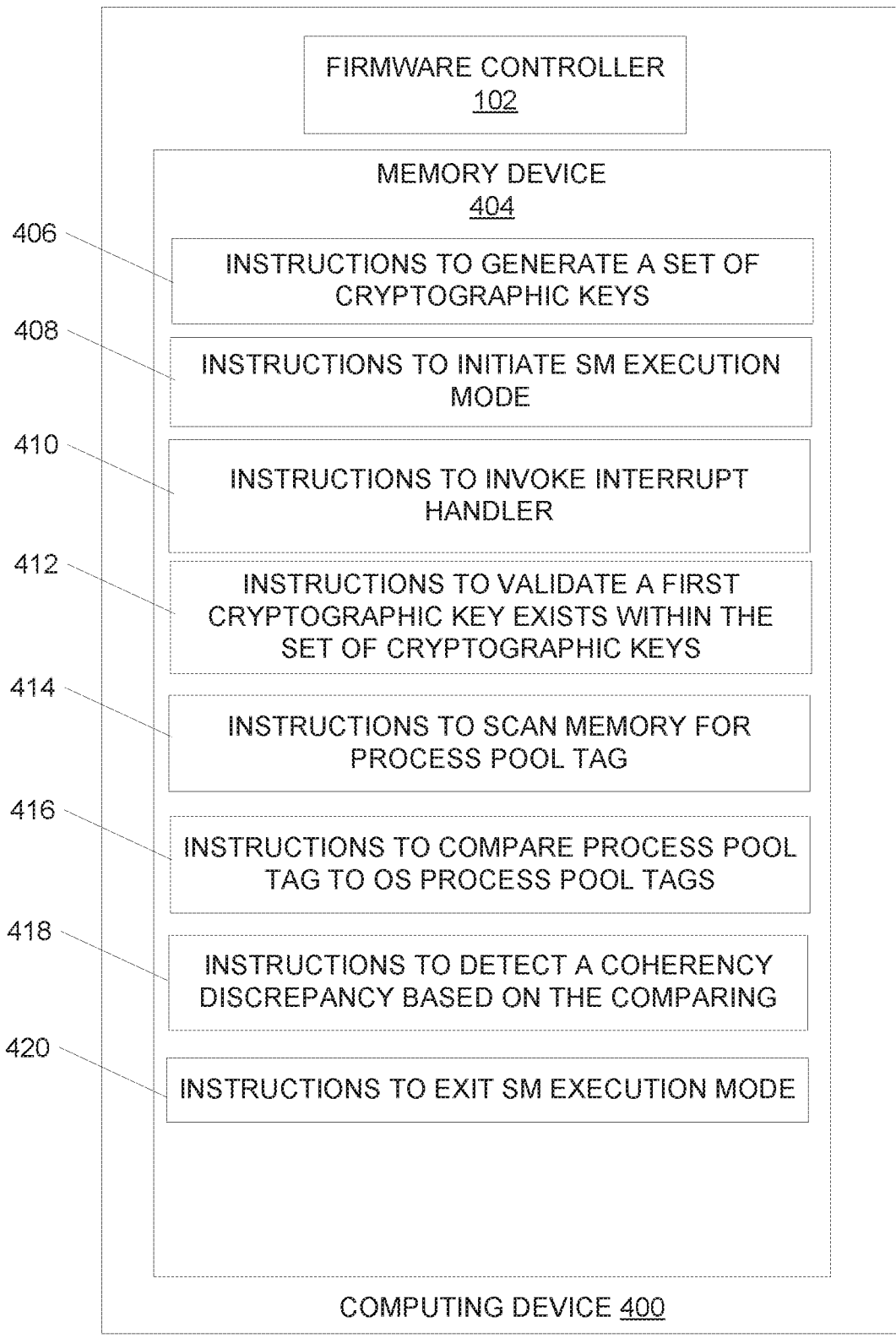
FIG. 4 is a diagram illustrating a method at a computing device for supporting system management memory coherency detection, according to an example.

FIG. 4 is a diagram illustrating a method at a computing device for supporting system management memory coherency detection, according to an example. The computing device 400 depicts a firmware controller 102 and a memory device 404 and, as an example of the computing device 400 performing its operations, the memory device 404 may include instructions 406-420 that are executable by the firmware controller 102. Thus, memory device 404 can be said to store program instructions that, when executed by firmware controller 102, implement the components of the computing device 400. The executable program instructions stored in the memory device 404 may be similar to the method as described in reference to FIG. 3 and may include, as an example, instructions to generate a set of cryptographic keys 406, instructions to initiate SM execution mode 408, instructions to invoke a interrupt handler 410, instructions to validate a first cryptographic key exists within the set of cryptographic keys 412, instructions to scan memory for process pool tag 414, instructions to compare process pool tag to operating system pool tags 416, instructions to detect a coherency discrepancy based on the comparing 418, and instructions to exit SM execution mode 420.

Memory device 404 represents generally any number of memory components capable of storing instructions that can be executed by the firmware controller 102. Memory device 404 is non-transitory in the sense that it does not encompass a transitory signal but instead is made up of at least one memory component configured to store the relevant instructions. Memory device 404 is distinct non-volatile memory storage separate from memory 104 as illustrated in FIG. 1. As a result, the memory device 404 may be a non-transitory computer-readable storage medium. Memory device 404 may be implemented in a single device or distributed across devices. Further, memory device 404 may be fully or partially integrated in the same device as firmware controller 102, or it may be separate but accessible to that device and firmware controller 102.

In one example, the program instructions 406-420 can be part of an installation package that when installed can be executed by firmware controller 102 to implement the components of the computing device 400. In this case, memory device 404 may be a portable medium such as a compact disc (CD), digital video disc (DVD), or flash drive or a memory maintained by a server from which the installation package can be downloaded and installed. In another example, the program instructions may be part of an application or applications already installed. In another, the program instructions 406-420 may be inclusive to a binary image configured to be stored or written to a non-volatile memory device. Here, memory device 404 can include integrated memory such as a hard drive, solid state drive, or the like.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

What is claimed is:

1. A computing device comprising:
   a memory including:
      a system management (SM) memory segment to store information regarding a processor in normal operation of an operating system of the computing device;
      an operating system memory segment to store a set of signatures of known process pool tags, wherein a known process pool tag identifies a process implemented in normal operation of the operating system; and a firmware controller communicatively coupled to the memory, wherein the firmware controller is to:
  initiate a SM execution mode of the computing device in response to an interruption to the normal operation of the operating system;
  scan the operating system memory segment to detect a process pool tag;
  generate a signature for the process pool tag that is detected;
  compare the signature generated for the process pool tag to the set of signatures of known process pool tags;
  detect a coherency discrepancy from comparing the signature generated for the process pool tag and the set of signatures of known process pool tags, wherein the coherency discrepancy indicates a presence of malware on the computing device;
  store the coherency discrepancy in the operating system memory segment for access by the operating system following exit from the SM execution mode; and
  exit the SM execution mode.

2. The computing device of claim 1, wherein the coherency discrepancy corresponds to a mismatch between the signature generated for the process pool tag and the set of signatures of known process pool tags.

3. The computing device of claim 1, wherein the set of signatures of known process pool tags comprises an output of an operating system application programming interface call.

4. The computing device of claim 1, wherein the firmware controller further invokes a handler upon initiating SM execution mode.

5. The computing device of claim 1, wherein the known process pool tag identifies the process implemented in normal operation of the operating system by location and type.

6. A method comprising:
  initiating a system management (SM) execution mode of a computing system in response to an interruption to normal operation of an operating system of the computing system, wherein individual processes of the operating system that are implemented during normal operation of the operating system are identified by a process pool tag;
  during the SM execution mode,
    scanning memory of the computing system to detect a process pool tag;
    generating a signature for the process pool tag that is detected;
    comparing the signature generated for the process pool tag that is detected to a set of signatures of process pool tags that are known to be implemented during normal operation of the operating system;
    detecting a coherency discrepancy based on comparing the signature generated for the process pool tag and the set of signatures of the process pool tags that are known to be implemented during normal operation of the operating system, wherein the coherency discrepancy indicates a malware infection in the computing system;
    writing a coherency discrepancy data structure with data related to the coherency discrepancy to an allocated memory accessible by the operating system following exit from the SM execution mode; and
    exiting the SM execution mode of the computing system.

7. The method of claim 6, wherein the coherency discrepancy corresponds to a mismatch between the signature generated for the process pool tag that is detected and the set of signatures of the process pool tags that are known to be implemented during normal operation of the operating system.

8. The method of claim 6, further comprising storing a set of cryptographic keys in system management random access memory of the computing system during the SM execution mode.

9. The method of claim 6, wherein the set of signatures of the process pool tags that are known to be implemented during normal operation of the operating system is stored in the memory and comprises an output of an operating system application programming interface call.

10. The method of claim 6, further comprising invoking a handler upon initiating SM execution mode.

11. A non-transitory computer readable medium storing instructions that, when executed by a firmware controller of a computing device, cause the firmware controller to:
  generate a set of cryptographic keys;
  store the set of cryptographic keys in system management random access memory (SMRAM) of the computing device; and
  in response to an interruption to normal operation of an operating system of the computing device, initiate a system management (SM) execution mode of the computing device;
  during the SM execution mode,
    retrieve a first cryptographic key from operating system memory of the computing device;
    validate the first cryptographic key exists within the set of cryptographic keys;
    scan memory of the computing device with an interrupt handler to detect a process pool tag;
    generate a signature for the process pool tag that is detected;
    compare the signature generated for the process pool tag to a set of signatures of known process pool tags, wherein a known process pool tag identifies a process implemented in normal operation of an operating system of the computing device;
    detect a coherency discrepancy from comparing the signature generated for the process pool tag and the set of signatures of known process pool tags, wherein the coherency discrepancy indicates a presence of malware on the computing device;
    store the coherency discrepancy in the memory for access by the operating system following exit from the SM execution mode; and
    exit the SM execution mode.

12. The non-transitory computer readable medium of claim 11, wherein the coherency discrepancy corresponds to a mismatch between the signature generated for the process pool tag and the set of signatures of known process pool tags.

13. The non-transitory computer readable medium of claim 1 storing further instructions that, when executed by the firmware controller, cause the firmware controller to store a second cryptographic key in a data structure in an allocated memory.

14. The non-transitory computer readable medium of claim 11, wherein the set of signatures of known process pool tags is stored in the memory and comprise an output of an operating system application programming interface call.

15. The non-transitory computer readable medium of claim 11, wherein to detect a coherency discrepancy from comparing the signature generated from the process pool tag and the set of signatures of known process pool tags, the non-transitory computer readable medium stores further instructions that, when executed by the firmware controller, cause the firmware controller to:
    determine whether the signature generated for the process pool tag exists within the set of signatures of known process pool tags.

\* \* \* \* \*